No. 774,095. PATENTED NOV. 1, 1904.
A. LINDGREN.
SEEDING MACHINE.
APPLICATION FILED AUG. 27, 1904.
NO MODEL. 3 SHEETS—SHEET 3.

Witnesses
Inventor
August Lindgren
By P. T. Dodge
Attorney

No. 774,095. Patented November 1, 1904.

UNITED STATES PATENT OFFICE.

AUGUST LINDGREN, OF MOLINE, ILLINOIS, ASSIGNOR TO THE MOLINE PLOW COMPANY, A CORPORATION OF ILLINOIS.

SEEDING-MACHINE.

SPECIFICATION forming part of Letters Patent No. 774,095, dated November 1, 1904.

Application filed August 27, 1904. Serial No. 222,402. (No model.)

*To all whom it may concern:*

Be it known that I, AUGUST LINDGREN, of Moline, county of Rock Island, and State of Illinois, have invented a new and useful Improvement in Seeding-Machines, of which the following is a specification.

This invention relates to machines for planting cotton, corn, or other seed, and has reference more particularly to the type of machine known as "lister-planters," which machines embody usually a main frame and a beam or other supporting member on which are mounted a seed-dropping mechanism and adjunctive devices, including a furrow-opener, subsoiler, seed-tube, and coverers.

The present invention is directed to various improvements in machines of this type relating particularly to the manner of connecting the furrow-opener with the beam through the medium of a standard of improved form and construction, to the form and construction of the seed-tube and subsoiler and their connection with the beam, and to the manner of connecting the coverers to adapt them to be adjusted vertically.

Figure 1:
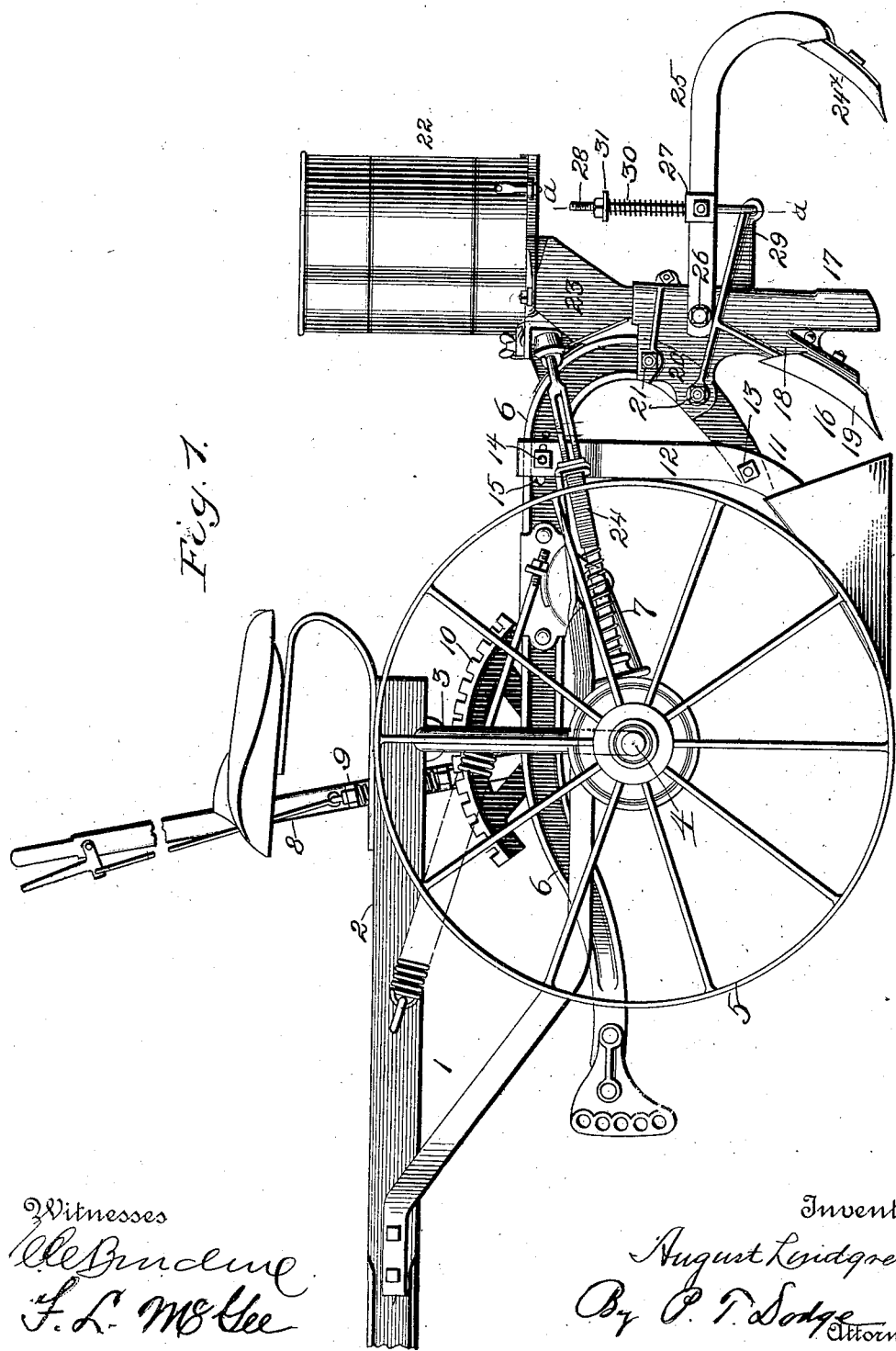
Figure 2:
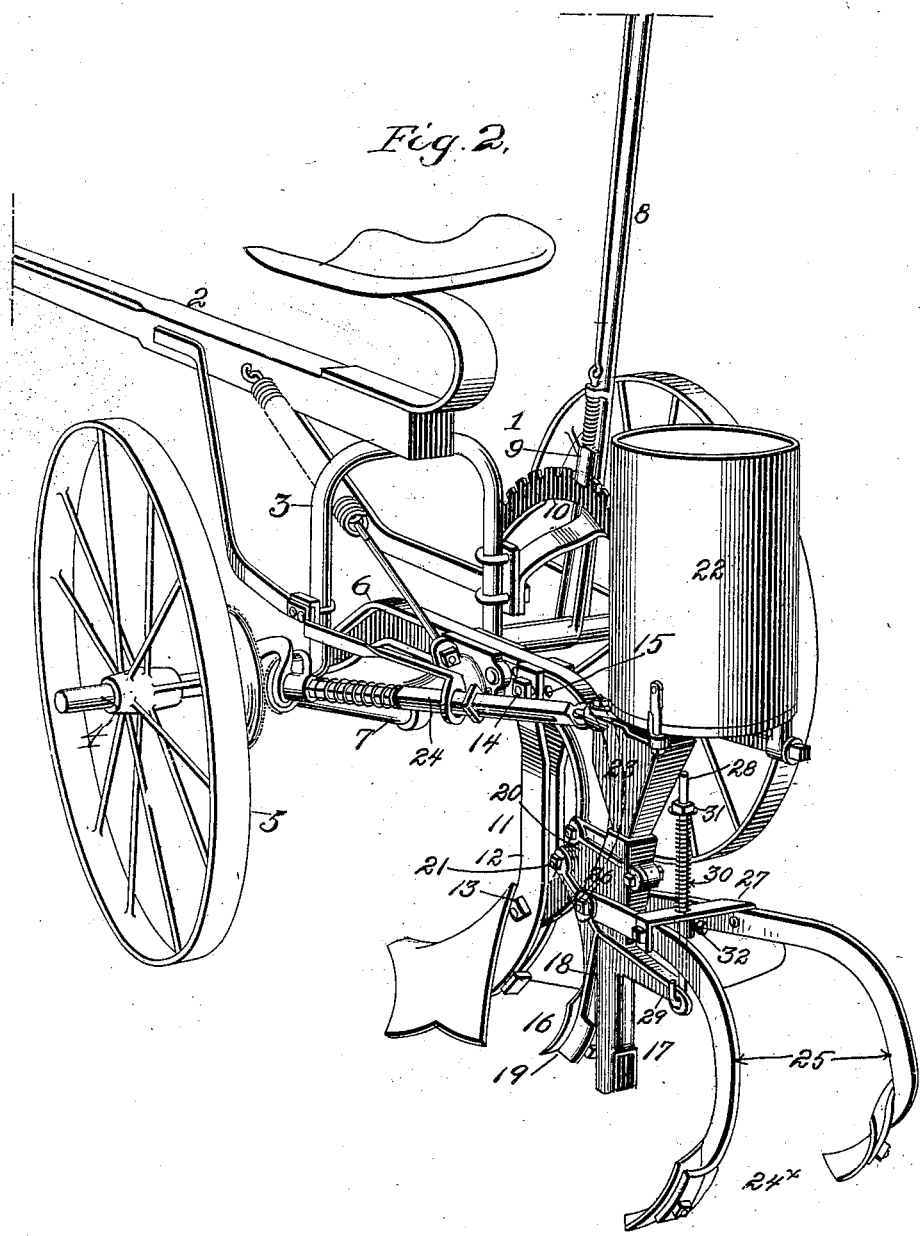
Figure 3:
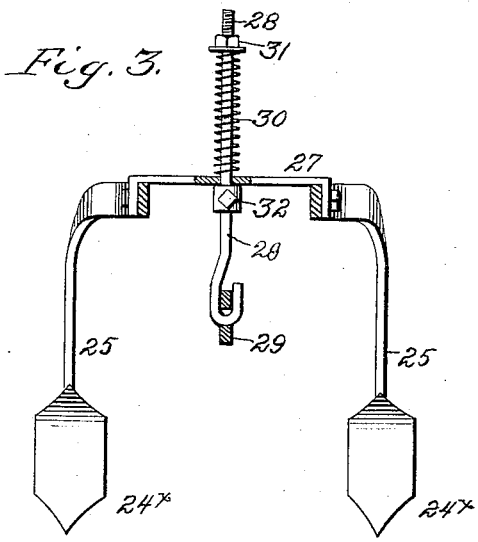
Figure 4:
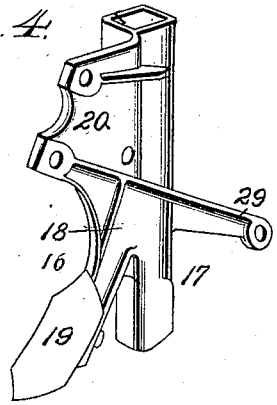

In the accompanying drawings, Figure 1 is a side elevation of my improved machine. Fig. 2 is a rear perspective view of the same. Fig. 3 is a transverse vertical section on the line $a\,a$ of Fig. 1, on an enlarged scale; and Fig. 4 is a perspective view of the seed-tube and connected subsoiler detached from the beam.

Referring to the drawings, 1 represents a wheeled frame comprising a tongue 2, an arched axle 3, fixed to the tongue and provided with wheel-spindles 4, on which ground-wheels 5 are mounted.

6 represents a longitudinal sustaining member in the form of a plow-beam extending between the wheels and connected with the frame so as to rise and fall with relation to the same, the connection being in the form of a bail 7, journaled at the ends of its two arms on the wheel-spindles at the inner sides of the ground-wheels and having its rear central portion journaled to the beam, the arrangement being such that by swinging the bail the beam may be raised or lowered. The movement of the bail is effected by hand-lever 8, fixed at its lower end to the inner end of the bail where it pivots on the wheel-spindle and provided with a latch 9, adapted to engage a toothed segment 10, fixed to the arched axle. At its rear the beam curves downward and then forward and has attached to it a standard 11, consisting of two bars 12, applied to the opposite sides of the lower extremity of the beam, to which they are connected a short distance above their lower ends by a through-bolt 13 in such manner as to allow of a pivotal motion on the lower extremity of the beam. From this point the bars constituting the standard extend upward to the horizontal upper portion of the beam, on opposite sides of the same, where they are adapted to be fastened by a removable bolt 14, extending through them and through the beam, which bolt is adapted to enter either of a number of holes 15, arranged at different points in the length of the beam, so that by shifting the upper end of the standard and securing it in different positions on the beam its inclination may be changed for the purpose of adapting it for furrow-opener blades of different shapes, according to the nature of the soil and kind of seed being planted.

As a result of the connection of the standard with the rear end of the beam in the manner described the former is given great resisting power and is enabled to effectually withstand the severe strains to which the furrow-opener or sweep is subjected in planting in hard ground. Furthermore, by reason of the connection of the standard adjacent to its lower end (where the furrow-opener is) with the lower extremity of the beam the draft is applied to the part of the standard where the greatest strains are received, so that firm support is given not only on a "straight pull," but when the standard is subjected to side strains.

It is obvious that the details of the form of connection between the standard and the beam and the form and construction of the standard may be modified within the skill of the mechanic without departing from the limits of my invention, the essence of which in this respect resides in the connection of the standard adjacent to its lower end with the lower extremity of the beam and the connection of the upper end of the standard with the upper overlying portion of the beam, and also in the connection of the standard in such manner that its inclination may be varied to suit different forms of sweeps or blades.

In rear of the standard the beam has attached to it a subsoiler 16 and seed-tube 17, which parts are in the form of a single structure or casting, such as represented in Fig. 4, where it will be seen that the casting embodies at its rear edge a vertical tube or spout, into the upper end of which the seed are discharged and from the lower end of which they enter the ground. Extending forwardly and downwardly from this tube about midway of its length is a shank 18, terminating at about the level of the seed-tube, to which shank a subsoiler-blade 19 is firmly fixed, and at its upper end the tube is provided with a forwardly-extending bracket-plate 20, which is adapted to be applied to the side of the beam and which is firmly fastened by bolts 21, extending through the plate and beam.

The seed to be planted is discharged into the seed-tube from a hopper 22, sustained on a horizontal bracket fixed to the rear end of the beam, which hopper may be provided in its bottom with a seed-discharging mechanism, (not shown,) feeding directly into a guide-spout 23, having its lower end entering the upper end of the seed-tube, the motion of the seed-discharging mechanism being imparted from the ground-wheels by means of a transmitting-shaft 24, operatively connected at its forward end with gearing driven from the ground-wheels and at its opposite end with the seed-discharging mechanism.

Arranged in rear of the seed-tube are two covering-shovels 24ˣ, fixed to the rear ends of shanks 25, extending horizontally forward with their ends pivotally connected with the bracket-plate 20 by means of a horizontal connecting-bolt 26. In rear of the seed-tube the shanks are connected together by means of a horizontal transverse spreader-brace 27, having a hole through which extends a vertical rod 28, jointed or connected at its lower end to the rear end of an arm 29, projecting rearwardly from the seed-tube. Above the spreader-brace the rod is encircled by a spiral spring 30, bearing at its lower end on the brace and at its upper end against a set-nut 31 on the rod, the arrangement being such that the shanks may yield vertically against the pressure of the spring and are held to their work with a yielding springy force. The downward motion of the shanks is limited by a collar 32, applied to the rod 28 at the under side of the spreader-brace, which latter rests on the collar. The collar is adjustable on the rod in order to effect the vertical adjustment of the shanks, and consequently the covering-shovels carried thereby. By the construction described it will be seen that the covering-shovels being pivoted at their forward ends are freely movable vertically, subject to the pressure of the spring, and that by means of the adjustable collar 32 the shovels may be adjusted vertically to adapt them to cover at different depths.

Having thus described my invention, what I claim is—

1. In combination with the fore-and-aft beam having its rear end extending downwardly and forwardly and provided in its upper main body portion with a number of holes arranged longitudinally side by side, a standard comprising two bars pivoted to the opposite sides of the lower extremity of the beam and extending upward at the opposite sides of the main portion of the beam, said bars being formed at their upper ends, each with a hole, and a fastening-bolt adapted to extend through the holes in said bars and through either of the several holes in the beam.

2. In combination with the frame, a fore-and-aft beam sustained thereby, a seed-dropping mechanism sustained by the beam, a seed-tube into which said mechanism discharges, a subsoiler-shank extending downwardly and forwardly from the seed-tube, and a bracket-plate extending forwardly from the seed-tube above the subsoiler-shank and secured to the beam.

3. In combination with a sustaining-frame, a seed-planting mechanism, covering devices movable vertically, a yielding resistant restraining said movement, a stop limiting the downward movement of the shovels, and means for adjusting said stop vertically.

4. In a seeding mechanism the combination of a frame, a supporting member mounted thereon, a seed-planting mechanism sustained by said supporting member, horizontal shanks provided at their rear ends with covering-shovels and having their forward ends pivotally sustained by the supporting member, a spreader-brace connecting said shanks, a vertical guide-rod extending through said brace and having its lower end pivotally sustained, a spring encircling said rod and bearing on the spreader-brace, and a stop on the rod beneath the spreader-brace.

5. In a seeding-machine the combination with a supporting member, of a seed-dropping mechanism sustained thereby, a casting embodying a seed-tube and subsoiler, fixed to said supporting member, two horizontal shanks provided at their rear ends with covering-shovels and having their forward ends pivotally connected with said casting, an arm extending rearwardly from said casting, a brace connecting said shanks and formed with an opening, a rod extending through the opening and jointed at its lower end to the arm, a spring on the rod above the brace and a stop on the rod beneath the brace.

6. In a seeding-machine the combination with a wheeled frame of a fore-and-aft beam, means for adjusting said beam vertically, a standard connected with the rear end of the beam, means for varying the inclination of the standard, a furrow-opener on the lower end of the standard, a seed-hopper sustained by the beam, a seed-discharging mechanism in said hopper operatively connected with the ground-wheel, a casting fixed to the beam and embodying a seed-tube and a subsoiler-shank, a subsoiler on said shank, covering-shovels, shanks connected therewith and pivoted to the casting, a spring acting to hold the covering-shovels yieldingly to their work, and a vertically-adjustable stop acting to limit the downward movement of the shovels.

7. As a new article of manufacture a unitary structure for use in seeding-machines, comprising a seed-tube and subsoiler-shank integral therewith.

8. As a new article of manufacture, a casting for use in seeding-machines, said casting comprising a vertical seed-tube, a subsoiler-shank and a bracket above the shank, said parts being integrally connected together.

In testimony whereof I hereunto set my hand, this 16th day of August, 1904, in the presence of two attesting witnesses.

AUGUST LINDGREN.

Witnesses:
C. H. LIPPINCOTT,
L. C. BLANDING.